United States Patent
Kordecki

[11] Patent Number: 6,124,710
[45] Date of Patent: Sep. 26, 2000

[54] ROTARY MAGNETIC ENCODER USING HALL EFFECT FOR DETECTING REVOLUTION OF A SHAFT

[75] Inventor: David L. Kordecki, Elkhart, Ind.

[73] Assignee: CTS Corporation, Elkhart, Ind.

[21] Appl. No.: 09/192,111

[22] Filed: Nov. 13, 1998

[51] Int. Cl.[7] .............................. G01B 7/30; G01P 3/487; H02K 11/00
[52] U.S. Cl. ................ 324/207.2; 324/174; 324/207.12; 324/207.25; 310/68 B
[58] Field of Search ............................ 324/207.12, 207.2, 324/207.21, 207.25, 173, 174; 310/68 B, 156; 73/514.39

[56] References Cited

U.S. PATENT DOCUMENTS

| | | |
|---|---|---|
| 3,112,464 | 11/1963 | Ratajski et al. . |
| 3,742,243 | 6/1973 | Gamble . |
| 4,392,375 | 7/1983 | Eguchi et al. . |
| 4,399,407 | 8/1983 | Kling et al. . |
| 4,570,118 | 2/1986 | Tomczak et al . |
| 4,642,496 | 2/1987 | Kerviel et al. ......................... 310/68 B |
| 4,703,261 | 10/1987 | Berchtold . |
| 4,777,464 | 10/1988 | Takabatashi et al. . |
| 4,890,059 | 12/1989 | Guentner ................................. 324/174 |
| 5,055,781 | 10/1991 | Sakakibara et al. . |
| 5,089,798 | 2/1992 | Miyata . |
| 5,159,268 | 10/1992 | Wu . |
| 5,164,668 | 11/1992 | Alfors . |
| 5,191,284 | 3/1993 | Moretti et al. . |
| 5,270,645 | 12/1993 | Wheeler et al. . |
| 5,565,834 | 10/1996 | Hanley et al. . |
| 5,654,633 | 8/1997 | Griffen et al. ........................... 324/174 |
| 5,712,561 | 1/1998 | McCurley et al. . |
| 5,754,085 | 5/1998 | Danby et al. . |
| 5,757,180 | 5/1998 | Chou et al. .......................... 324/207.2 |

FOREIGN PATENT DOCUMENTS

| | | |
|---|---|---|
| 893986 | 4/1962 | United Kingdom . |
| 990993 | 5/1965 | United Kingdom . |
| 2 229 006 | 12/1990 | United Kingdom . |

OTHER PUBLICATIONS

European Patent Office, "Patent Abstract of Japan", Publication No. JP3074812, "Ferrite Magnetic Material", Publication Date Mar. 29, 1991.

*Primary Examiner*—Gerard Strecker
*Attorney, Agent, or Firm*—Mark P. Bourgeois; Mark W. Borgman

[57] ABSTRACT

According to the present invention, a zero-speed rotary pulse generator is disclosed. The zero-speed rotary pulse generator detects and counts shaft rotation of DC motors. The invention measures the rotation of a shaft by being coupled to a disc-shaped magnet having alternating polarity on its face. The magnet rotates at the same speed as the motor. Positioned close to the rotating magnet is a Hall effect device that can sense the alternating magnet polarity as the shaft rotates. The Hall effect device provides a digital output based upon the direction and the strength of the magnetic field it senses.

7 Claims, 2 Drawing Sheets

ROTARY MAGNETIC ENCODER USING HALL EFFECT FOR DETECTING REVOLUTION OF A SHAFT

BACKGROUND OF THE INVENTION

1. Technical Fields

This invention generally relates to instruments of the type which translate movement into electrical signals and more specifically relates to an instrument using the Hall effect to detect the revolution of a shaft.

2. Background Art

Position sensors are widely used in the automotive industry to measure engine-shaft position in such applications including the electrical movement of vehicle seats, into positions selected by a user, as referred to as power seats. Power seats typically move forward, backward, up, down, and tilt. Position sensors are used to measure how many times a power seat motor shaft turns, which allows the position of the power seat to be calculated. Knowing the position of a power seat allows it to be captured into a memory, storing the position for the user to recall at a later time. The recall of seat positions allows for several users to program preferred seat positions.

Various conventional devices relate to position sensors. Examples of patents pertinent to the present invention include:

Japanese Patent No. A 3,074,812 to Atsushi for ferrite magnetic material;

British Patent No. 990,993 to Craxton for improvements in and relating to electric signal generators;

U.S. Pat. No. 4,570,118 to Tomczak et al. for an angular position transducer including permanent magnets and Hall effect device; and U.S. Pat. No. 5,712,561 to McCurley et al. for a field strength position sensor with improved bearing tolerance in a reduce space;

each of which is herein incorporated by reference for its pertinent and supportive teachings.

Problems exist with the rotary encoders in the aforementioned references. For instance, rotary encoders are used in close proximity to a DC motor in many automotive applications. Yet, DC motors create electrical noise that interrupts the functioning of rotary encoders. Therefore, there existed a need to provide a rotary encoder that provides electrical noise immunity when working in close proximity to a DC motor.

The foregoing patents reflect the most relevant state of the art of which the applicant is aware and are tendered with the view toward discharging applicant's acknowledged duty of candor in disclosing information that may be pertinent in the examination of this application. It is respectfully stipulated, however, that none of these patents teach or render obvious, singly or when considered in combination, applicants' claimed invention.

SUMMARY OF INVENTION

According to the present invention, a zero-speed rotary pulse generator is disclosed. The zero-speed rotary pulse generator detects and counts shaft rotation of DC motors. The invention measures the rotation of a shaft by being coupled to a disc-shaped magnet having alternating polarity on its face. The magnet rotates at the same speed as the motor. Positioned close to the rotating magnet is a Hall effect device that can sense the alternating magnet polarity as the shaft rotates. The Hall effect device provides a digital output based upon the direction or strength of the magnetic field it senses.

There has thus been outlined, rather broadly, the more important features of the invention so that the detailed description thereof that follows may be better understood. There are, of course, additional features of the invention that will be described hereinafter which will form the subject matter of the appended claims. Those skilled in the art will appreciate that the preferred embodiment may readily be used as a basis for designing other structures, methods and systems for carrying out the several purposes of the present invention. It is important, therefore, that the claims are regarded as including such equivalent constructions since they do not depart from the spirit and scope of the present invention.

BRIEF DESCRIPTION OF DRAWINGS

The preferred embodiments of the present invention will hereinafter be described in conjunction with the appended drawings, where like designations denote like elements, and.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

BEST MODE FOR CARRYING OUT THE INVENTION

Figure 1:
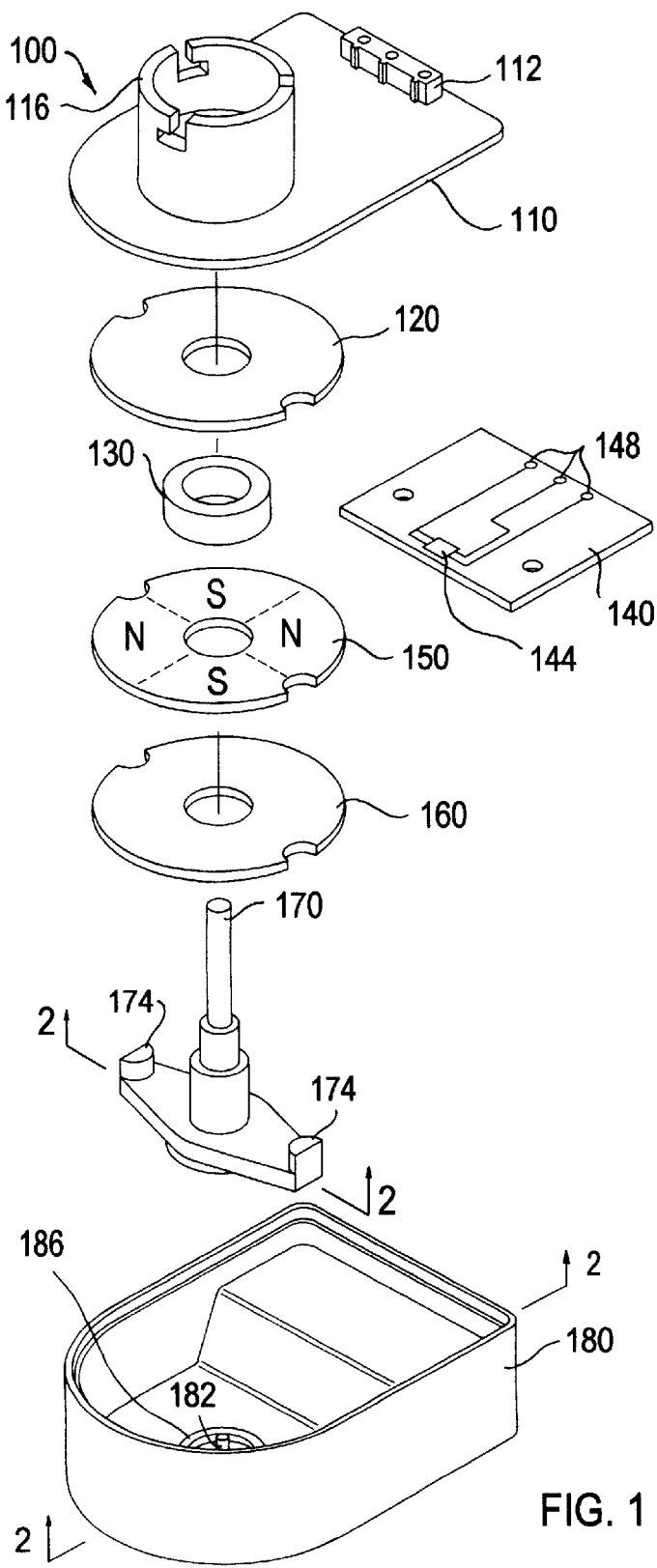
FIG. 1 is an isometric view of a preferred embodiment of a zero-speed rotary pulse generator.
Figure 2:
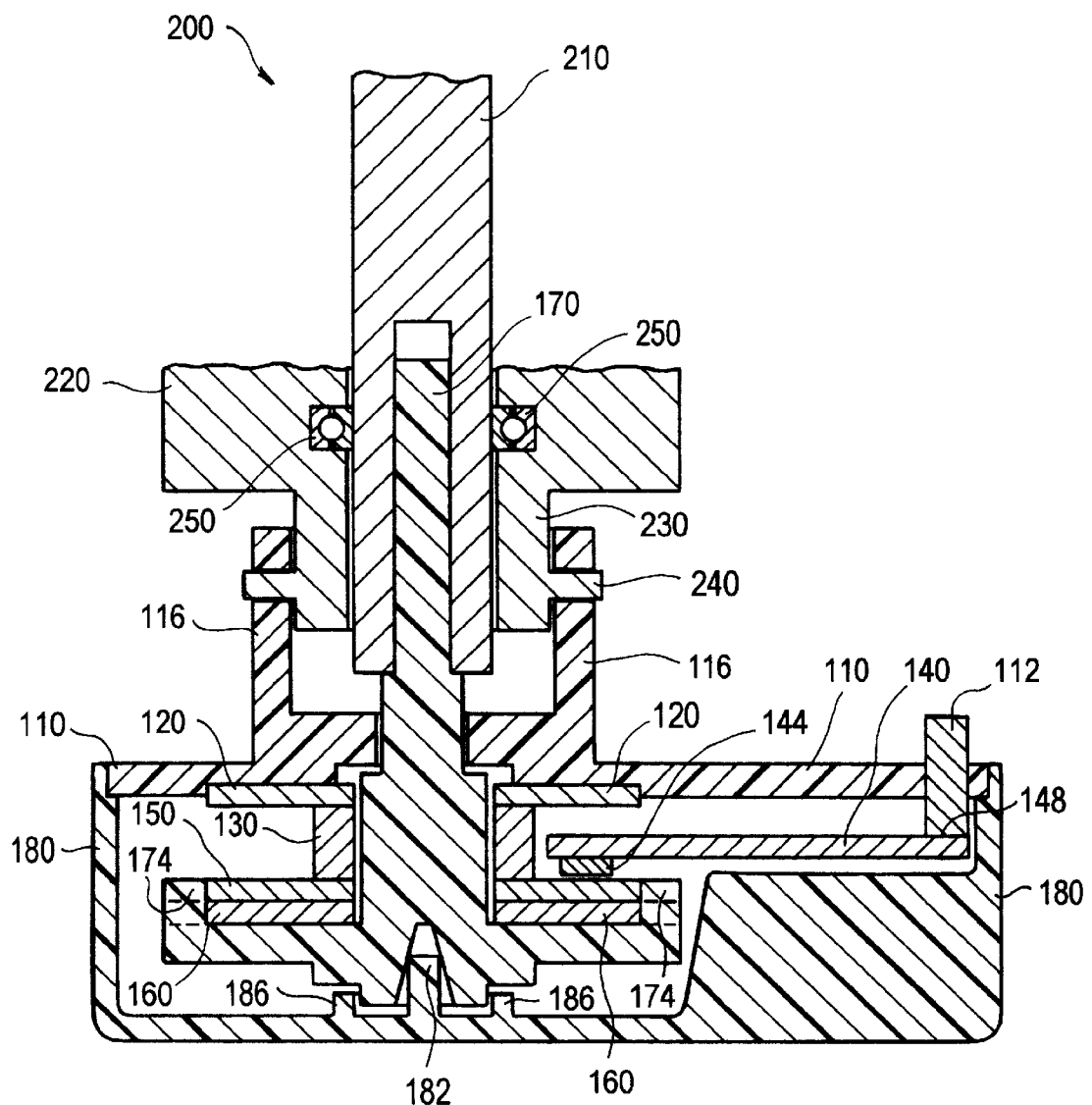
FIG. 2 is a side view of a preferred embodiment of a zero-speed rotary pulse generator attached to a DC motor housing.

Referring now to FIGS. 1 and 2, an isometric view and a side view of a zero-speed rotary pulse generator 100 is illustrated. Cover 110 provides one mechanical bearing surface for shaft 170. The hole in cover 110 receives the end of shaft 170. The end of shaft 170 then fits into the hole of motor shaft 210. Collar 116 is incorporated into cover 110 with L-hooks to provide a twist-lock feature so that the zero-speed rotary pulse generator can be mounted to motor housing extension 230. Electrical Wire Connector 112 is a power connector to connect the zero-speed rotary pulse generator to circuitry (not shown) that stores the position of the seat, and controls the motor operations, and performs other functions.

Stationary pole piece 120 may be attached to cover 110, and may be made out of steel or any magnetically conducting material. Stationary pole piece 120 works in conjunction with Rotating pole piece 160 to provide immunity from magnetic fields emitted from the motor. Bushing 130 and pole piece 160 are also made out of steel or any magnetically conducting material to provide further magnetic field immunity emitted from the motor. Bushing 130 further serves to provide spacing between stationary pole piece 120 and disc-shaped magnet 150. The spacing that bushing 130 provides is necessary so that printed circuit board 140 can fit between stationary pole piece 120 and disc-shaped magnet 150 without touching either of them. This spacing also controls the gap in the magnetic circuit.

Printed circuit board 140 may be attached to cover 110. Printed circuit board 140 receives power through connection means 148, which connects to electrical wire connector 112. Connection means 148 are preferably electrical terminals that hook directly into pins in electrical wire connector 112. Hall effect device 144 is mounted to printed circuit board 140. Hall effect device 144 is a magnetic sensing device. When sensing the North pole of a magnet, Hall effect device 144, in conjunction with printed circuit board 140, generates an output of "high," which translates into a voltage of 1. When sensing the South pole of a magnet, Hall effect device 144, in conjunction with printed circuit board 140, generates an output of "low," which translate into a voltage of 0. In this manner, the zero-speed rotary pulse generator works like a digital switch.

Disc-shaped magnet 150 has polarity which alternates from North to South on its face. The face of disc-shaped magnet 150 is configured to generate 2 pulses with every 360° revolution. Those skilled in the art will recognize that disc-shaped magnet 150 can also be configured to generate 1, or 4, or 8 pulses per revolution, and even more before the density of disc-shaped magnet becomes a limiting factor. The number of pulses per revolution is merely a function of how disc-shaped magnet 150 is magnetized.

Disc-shaped magnet 150 is notched to receive wings 174 of shaft 170. Rotating pole piece 160 is also notched to receive wings 174 of shaft 170. In this manner, disc-shaped magnet 150 and rotating pole piece 160 are coupled to and rotate with shaft 170. Rotating pole piece 160 works in conjunction with stationary pole piece 120 to provide magnetic field immunity to the zero-speed rotary pulse generator. Although stationary pole piece 120 is also notched, stationary pole piece does not receive wings 174, nor is it coupled to shaft 170. Instead, the notches in stationary pole piece 120 are used for mounting and anti-rotation purposes.

Shaft 170 may be a solid plastic piece that fits into motor shaft 210. The motor turns shaft 170. Shaft 170 is coupled via wings 175 to disc-shaped magnet 150 and rotating pole piece 160. Thus, when shaft 170 turns, so do disc-shaped magnet 150 and rotating pole piece 160. Shaft 170 fits loosely through bushing 130, stationary pole piece 120 and cover 110. Thus, when shaft 170 turns, bushing 130, stationary pole piece 120 and cover 110 remain stationary. Housing 180 provides the lower bearing surface for the shaft 170. Locator pin 182 is an optional element and serves to center shaft 170 in housing 180 during the assembly of the zero-speed rotary pulse generator.

The side view in FIG. 2 more clearly illustrates some of the features of the zero-speed rotary pulse generator 100 attached to a DC motor 200. Motor shaft 210 receives shaft 170 and serves to rotate shaft 170. Collar 116 of cover 110 locks into motor housing extension 230 via twist lock-on part 240. Ball bearing race 250 allows free rotation of motor shaft 210 within motor housing 220 and motor housing extension 230. Stationary pole piece 120 is attached to cover 110. Bushing 130 provides spacing between stationary pole piece 120 and disc-shaped magnet 150. Printed circuit board 140 fits within the space provided by bushing 130. Hall effect device 144 is mounted on printed circuit board in the space between stationary pole piece 120 and disc-shaped magnet 150. Printed circuit board 140 is connected to electrical wire connector 112 via connection means 148. Disc-shaped magnet 150 and rotating pole piece 160 are coupled to shaft 170 via wings 174. Housing 180 encloses the zero-speed rotary pulse generator, provides lower bearing surface 186, and locator pin 182, which is used to align shaft 170 into housing 180 during assembly.

Although the preferred embodiment describes shaft 170 extending from zero-speed rotary pulse generator 100, it is contemplated to have any means for coupling motor shaft 210 to the rotating parts of the zero-speed rotary pulse generator. For example, a hole could extend through the rotating parts of zero-speed rotary pulse generator 100 and motor shaft 210 could extend into the hole thereby contacting and rotating those respective parts.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   a) a housing suitable sized to be coupled to a motor housing, said housing having a hole therein;
   b) a coupling means extending from within the housing, through the hole, for coupling the apparatus to a motor shaft;
   c) a first disc-shaped pole piece attached to an interior surface of said housing such that a hole in said first disc-shaped pole piece aligns with said hole in said housing;
   d) a disc-shaped magnet attached to said coupling means within said housing, a face of said disc shaped magnet having alternating polarity;
   e) a second disc-shaped pole piece attached to said coupling means and located between said coupling means and said disc-shaped magnet, said first and second disc-shaped pole pieces providing a magnetic path; and
   f) a Hall effect device attached to said housing, said Hall effect device positioned between said first disc-shaped pole piece and said disc-shaped magnet, said Hall effect device sensing said alternating polarity on the face of said disc-shaped magnet as said coupling means rotates.

2. The apparatus of claim 1, wherein said coupling means is a shaft, said shaft residing in said housing, said shaft free to rotate within said housing, one end of said shaft extending out of said housing through said hole in said housing, said one end of said shaft suitably sized to be coupled to a motor shaft.

3. The apparatus of claim 1, further comprising a means to coupled said housing to said motor housing.

4. The apparatus of claim 3, wherein the means to couple said housing to said motor housing are L-hooks which allow said housing to be twisted and locked onto said motor housing.

5. The apparatus of claim 1, further comprising a bushing into which said shaft is inserted, said bushing residing between said first disc-shaped pole piece and said disc-shaped magnet to provide spacing for said Hall effect device.

6. The apparatus of claim 1, further comprising a printed circuit board residing in said housing, said printed circuit board coupled to said Hall effect device.

7. A rotary magnetic encoder for attachment to a rotating device, comprising:
   a) a housing having an aperture therein;
   b) a shaft extending from within the housing, through the aperture and ending outside the housing, for coupling the encoder to the rotating device;
   c) a first disc-shaped pole piece attached to a surface within the housing, the first disc-shaped pole piece having an aperture, through which the shaft passes;

d) a disc-shaped magnet attached to the shaft within the housing, a surface of the magnet having alternating polarity;

e) a second disc-shaped pole piece attached to the shaft and located between the shaft and the magnet, the first and second pole pieces providing a magnetic path; and f) a Hall effect device attached to the housing and located between the first disc-shaped pole piece and the disc-shaped magnet, the Hall effect device sensing the alternating polarity of the magnet as the shaft rotates.

* * * * *